(12) United States Patent
Lawson (10) Patent No.: US 8,403,415 B2
(45) Date of Patent: Mar. 26, 2013

(54) AIRCRAFT PASSENGER SEAT RECLINE MECHANISM

(75) Inventor: Bobby Wayne Lawson, Walnut Cove, NC (US)

(73) Assignee: BE Aerospace, Inc., Wellington, FL (US)

(*) Notice: Subject to any disclaimer, the term of this patent is extended or adjusted under 35 U.S.C. 154(b) by 303 days.

(21) Appl. No.: 12/856,931

(22) Filed: Aug. 16, 2010

(65) Prior Publication Data

US 2012/0038196 A1    Feb. 16, 2012

(51) Int. Cl.
*B60N 2/34* (2006.01)
*A47C 1/035* (2006.01)

(52) U.S. Cl. ............... 297/329; 297/354.13; 297/318; 297/322

(58) Field of Classification Search .......... 297/354.13, 297/317, 318, 320, 322, 325, 329
See application file for complete search history.

(56) References Cited

U.S. PATENT DOCUMENTS

| | | | |
|---|---|---|---|
| 6,305,644 B1* | 10/2001 | Beroth | 244/118.5 |
| 6,688,691 B2* | 2/2004 | Marechal et al. | 297/317 |
| 6,692,069 B2* | 2/2004 | Beroth et al. | 297/118 |
| 6,929,320 B2* | 8/2005 | Laurent | 297/83 |
| 7,213,882 B2* | 5/2007 | Dryburgh et al. | 297/354.13 |
| 7,665,693 B2* | 2/2010 | Bettell | 244/122 R |
| 2004/0036336 A1 | 2/2004 | Veneruso | |
| 2007/0262625 A1 | 11/2007 | Dryburgh | |
| 2010/0201172 A1* | 8/2010 | Hudswell et al. | 297/340 |

OTHER PUBLICATIONS

International Search Report for PCT/US2011/047392 dated Oct. 20, 2011. PCT Published Application mailing dated Feb. 23, 2012.

* cited by examiner

*Primary Examiner* — David Dunn
*Assistant Examiner* — Richard Lowry
(74) *Attorney, Agent, or Firm* — Shumaker, Loop & Kendrick, LLP (57) ABSTRACT

An adjustable passenger seat having a seat recline mechanism and including a seat base having first and second non-intersecting seat path guide slots for guiding the travel of a translation guide assembly interconnected to a linear translating seat pan drive rail through the seat pan such that translational movement of the drive rail with respect to the seat base causes movement of the seat pan and the seat back between upright and flat seating positions.

13 Claims, 7 Drawing Sheets

AIRCRAFT PASSENGER SEAT RECLINE MECHANISM

TECHNICAL FIELD AND BACKGROUND OF THE INVENTION

1. Field of the Invention

The present invention relates generally to the field of aircraft passenger seat recline mechanisms, and more particularly, to a slot-guided seat recline mechanism infinitely adjustable between upright and flat seating positions and customizable to accommodate individual airline specifications of seat back and seat pan angles throughout the range of motion of the mechanism.

2. Background of the Invention

Premium class airline passenger seats are typically able to adjust between upright and flat seating positions to provide passenger comfort and comply with taxi, take-off and landing seating position requirements. Such passenger seats typically include a seat back and seat pan, often times linked in motion, supported by a frame and adjustable in angle by way of a seat recline mechanism. While conventional seat recline mechanisms are able to achieve a transition from upright to flat seating positions, they typically include fixed and complex, interconnected linkage that does not allow for the substitution of a component to readily customize the seat back and seat pan angles throughout the range of motion of the mechanism.

Accordingly, to overcome the disadvantages of conventional seat recline mechanism design, provided herein is a customizable seat recline mechanism that allows for the ready alteration of the geometry of components and distances between linkage pivot points to accommodate individual airline seat specifications with regard to seat angles.

BRIEF SUMMARY OF THE INVENTION

In one aspect, an aircraft passenger seat is provided including a seat mechanism for driving movement of the seat between upright and flat seating positions.

In another aspect, an aircraft passenger seat is provided configured for infinite adjustment between upright and flat seating positions within the limits of the seat mechanism.

In another aspect, an aircraft passenger seat is provided including a seat mechanism customizable for individual airline specifications of seat back and seat pan angle throughout the range of motion of the seat mechanism.

In another aspect, customization of the seat mechanism is achieved by ready modification of the geometry of guide slots and distances between linkage pivot points.

In another aspect, the seat mechanism drives the travel of the seat back and the seat pan, and optionally simultaneously drives the travel of an associated leg rest.

In another aspect, the seat mechanism may be used in conjunction with moveable armrests mechanically linked to the translation system or manually operated from an upright support position to a lowered bed position using a fixed slide mounted on the base frame.

To achieve the foregoing and other aspects and advantages, in one embodiment the present invention provides an aircraft passenger seat recline mechanism including a seat back and a seat pan pivotally connected at a rearward end of the seat pan, a seat base having first and second non-intersecting seat path guide slots, a seat pan drive rail translatable relative to the seat base and pivotally connected at a forward end thereof to a forward end of the seat pan, a translation guide assembly having spaced-apart first and second guides carried in the first and second guide slots, respectively, and pivotally connected to the rearward end of the seat pan, and a seat back drive link pivotally interconnecting the translation guide assembly with the seat back. In operation, movement of the drive rail with respect to the seat base causes movement of the seat pan and movement of the translation guide assembly with respect to the first and second guide slots to adjust seat back and seat pan angles.

In a further embodiment, the first and second guide slots are staggered with respect to a vertical axis of the seat and each define an arcuate pathway such that movement of the translation guide assembly from rearward ends of the guide slots to forward ends of the guide slots causes rotational and translational motion of the translation guide assembly with respect to the seat base.

In a further embodiment, the first and second guide slots diverge at their corresponding ends and converge about their midsections.

In a further embodiment, the seat pan drive rail is linear and the movement thereof causes linear movement of a pivot of the drive rail and the seat pan with respect to the seat base.

In a further embodiment, the seat back drive link is pivotally connected to the translation guide assembly intermediate the first and second guides.

In a further embodiment, the second guide of the translation guide assembly is positioned intermediate a pivot of the seat back drive link and the translation guide assembly and a pivot of the translation guide assembly and the seat pan.

In a further embodiment, the seat recline mechanism includes an adjustable leg rest assembly attached to the forward end of the seat pan, the leg rest assembly including a leg rest pivotally connected to a forward end of the seat pan and leg rest drive linkage pivotally connected to the pivot of the drive rail and the seat pan such that translation of the drive rail with respect to the seat base causes the leg rest to pivot with respect to the seat pan.

In a further embodiment, at least one of the seat back, seat pan and the leg rest carries a cushion thereon.

In a further embodiment, the seat recline mechanism includes a back stop link connected to the seat back and pivotally connected to the rearward end of the seat pan above a translation guide assembly connection point with the seat pan.

Additional features, aspects and advantages of the invention are set forth in the detailed description which follows, and in part will be readily apparent to those skilled in the art from that description or recognized by practicing the invention as described herein.

BRIEF DESCRIPTION OF THE DRAWINGS

The present invention is understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

A seat recline mechanism is provided herein for use with an aircraft passenger seat generally including a seat back, seat pan and base frame. The seat recline mechanism generally functions to adjust the seat between upright and flat seating positions, with infinite adjustment therebetween. As used throughout the specification, the term "upright" seating position is intended to describe a taxi, take-off and landing compliant seat back configuration, "reclined" seating position is intended to describe a seating position in which the seat back is reclined relative to the upright seat back configuration, and "flat" seating position is intended to describe a configuration in which the seat back and seat pan form a substantially flat and continuous surface. The terms "forward end" and "rearward end" as used herein refer to opposing ends of components, such as the seat pan, with the term "forward end" generally referring to the direction of the foot end of the seat and the term "rearward end" generally referring to the direction of the head end of the seat. "Forward end" and "rearward end" may be used interchangeably herein with the terms "first end" and "second end", respectively.

Although the seat recline mechanism is shown and described herein with reference to only a single side of the associated seat for purposes of clarity (i.e. the right side of the seat), it is understood that the seat recline mechanism preferably includes an assembly positioned on each side of the seat and working in cooperation to adjust the seating position. Thus, the left side assembly not shown may essentially be a mirror image of the right side assembly shown, and may or may not include driving members. For example, in one embodiment, the left and right side assemblies are simultaneously driven by at least one rotary controlled actuator via pinion gears on each side of an actuator driven shaft as known to those skilled in the art. In an alternative embodiment, only a single side of the seat may be actuator driven, with both sides including guide slot assemblies as described in detail below.

Figure 1:
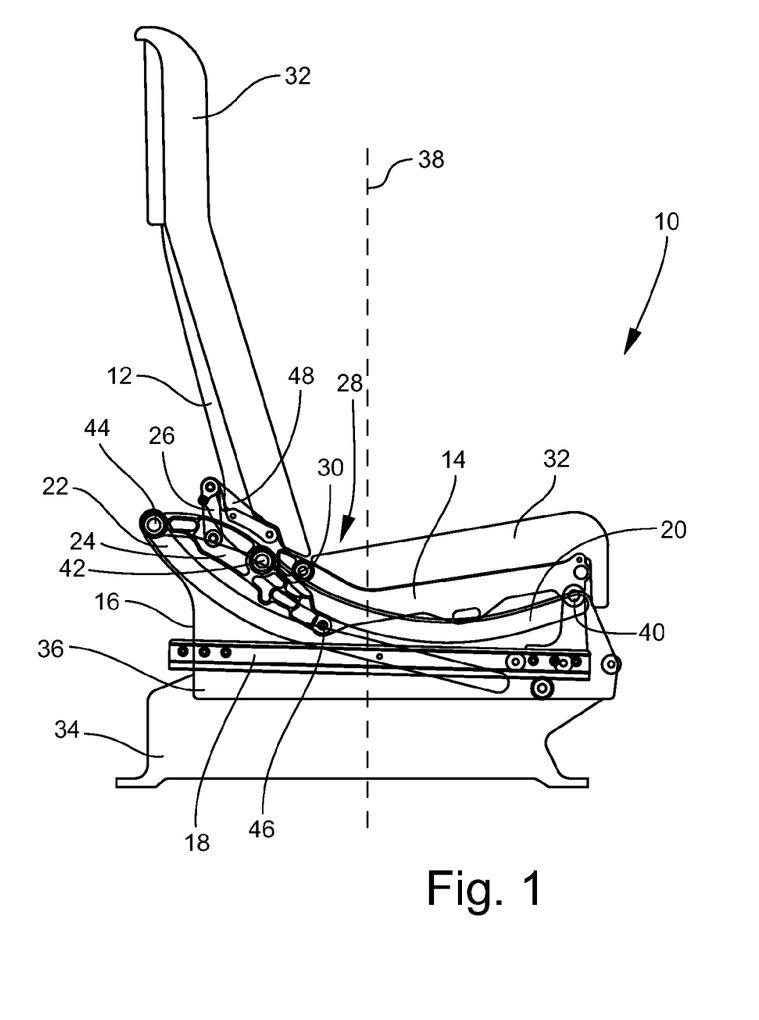
FIG. 1 is a side elevation view of a passenger seat recline mechanism shown in an upright seating position.
Figure 2:
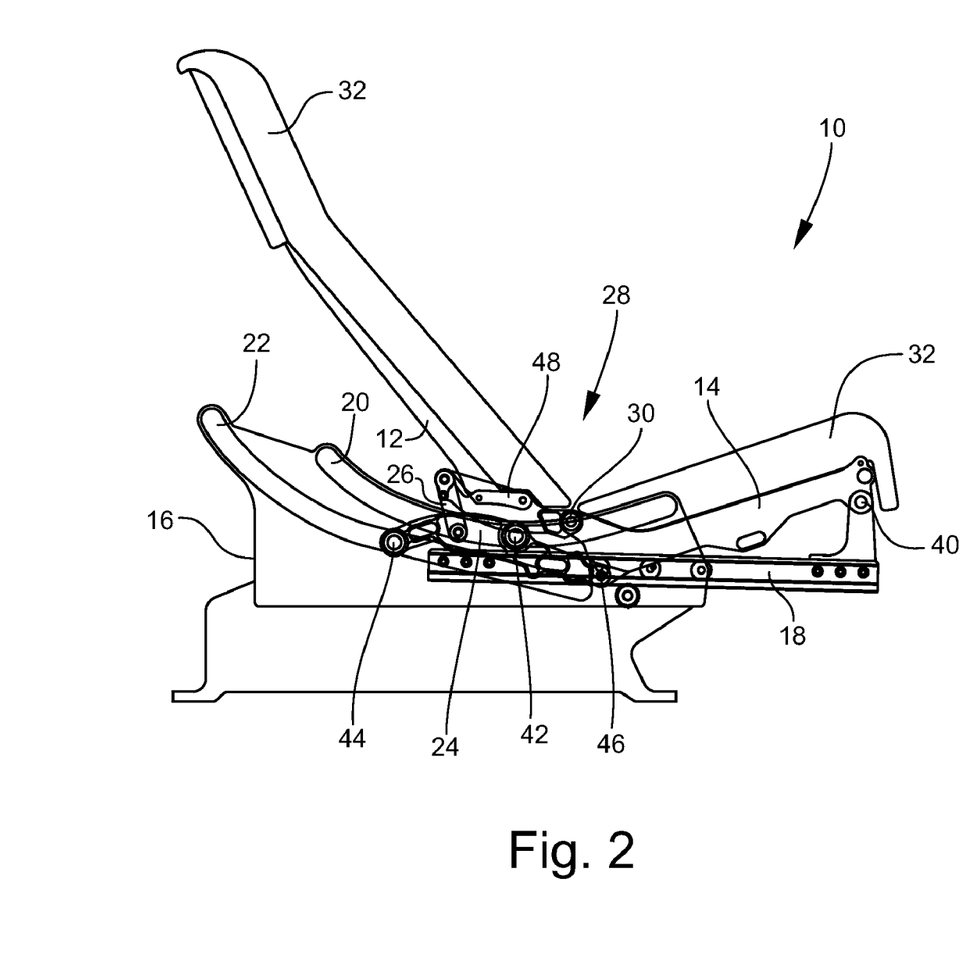
FIG. 2 is a side elevation view of the seat recline mechanism of FIG. 1 shown in a reclined seating position.
Figure 3:
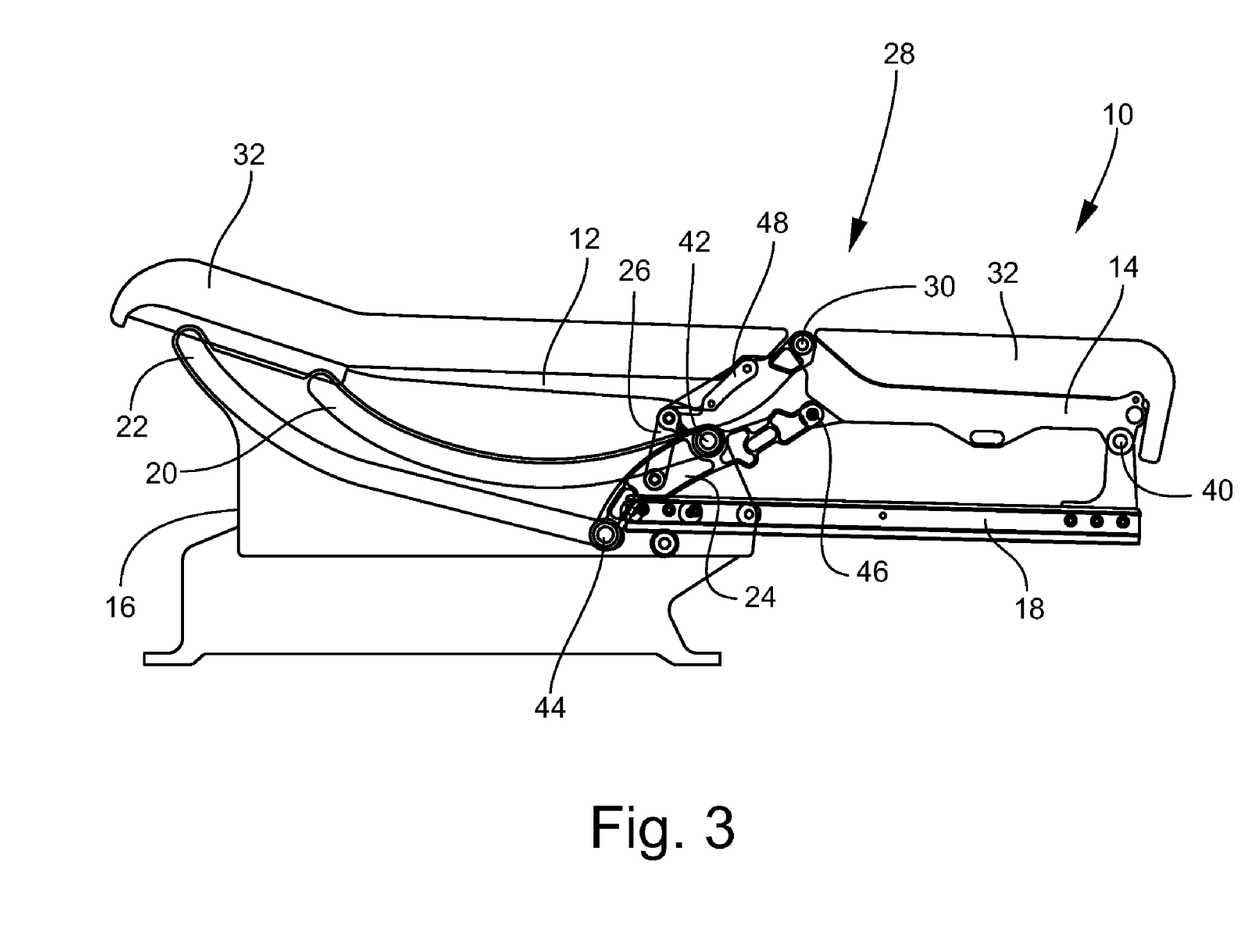
FIG. 3 is a side elevation view of the seat recline mechanism of FIG. 1 shown in a flat seating position.
Figure 4:
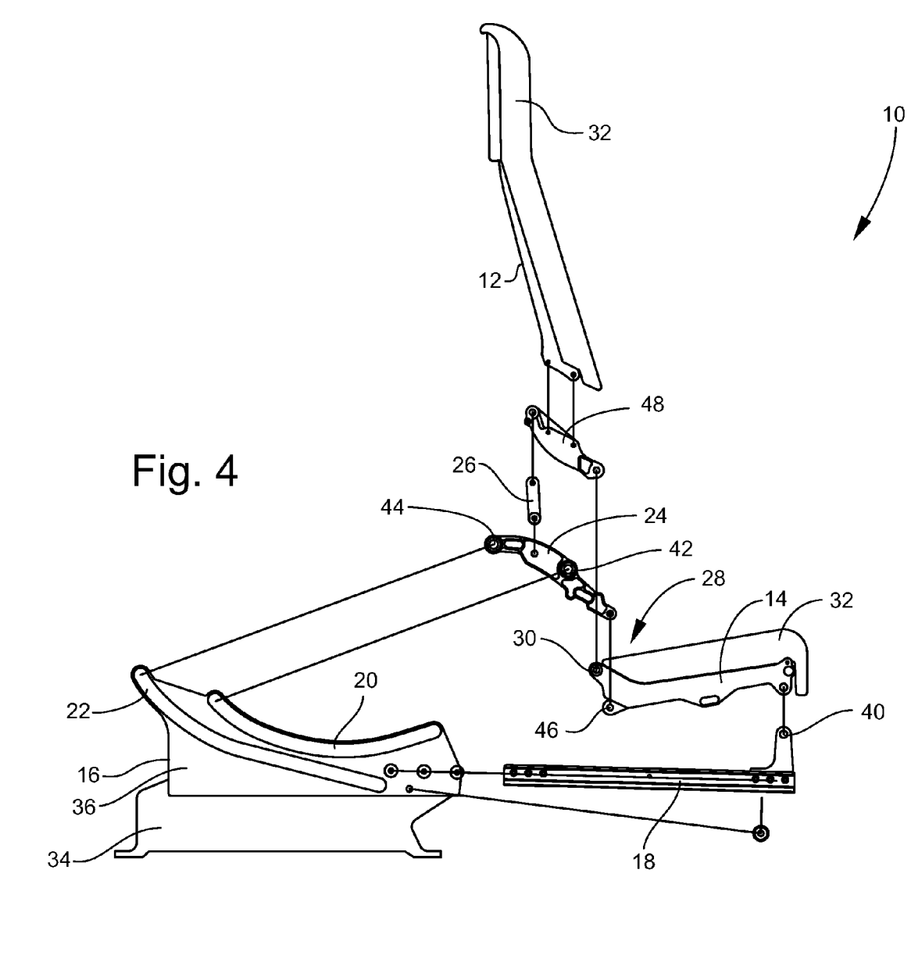
FIG. 4 is an exploded view of the seat recline mechanism of FIG. 1 illustrating the principal parts of the mechanism.

Referring to the figures, a seat recline mechanism is shown generally at reference numeral 10. The seat recline mechanism 10 functions to move a pivotally connected seat back 12 and seat pan 14 through a complex path as they travel from upright to flat seating positions. Generally, the seat pan 12 moves from a slightly rearward inclined position (i.e. with the forward end higher than the rearward end) in the upright seating position (see FIG. 1), to a more rearward inclined position in the reclined seating position (see FIG. 2), to a horizontal position in the flat seating position (see FIG. 3). In other words, the seat pan 14 first increases and then decreases its inclination as the seat back 14 reclines. The upper end of the seat back 12 moves substantially vertically downwards as the seat back 12 reclines, while the lower end of the seat back 12 moves forward and remains adjacent to the forward end of the translating seat pan 14.

Referring to FIGS. 1-4, a first embodiment of the seat recline mechanism 10 generally includes seat back 12, seat pan 14, seat base 16, drive rail 18, first and second guide slots 20, 22, translation guide assembly 24, and seat back drive link 26. Seat back 12 is pivotally connected to rearward end 28 of seat pan 14 at pivot 30 such that seat back 12 and seat pan 14 pivot relative to one another and are linked in motion. Seat back 12 and seat pan 14 each carry supportive cushion 32 for passenger comfort.

Seat base 16 is configured to be fixed to the floor of the passenger compartment by suitable mounting hardware. As shown, seat base 16 includes supportive base 34 and lateral side plate 36 including first and second guide slots 20, 22. Guide slots 20, 22 are staggered with respect to vertical seat axis 38 and each define an arcuate pathway terminating in a first end at a rearward end of plate 36 and in a second end proximate a forward end of plate 36. First and second guide slots 20, 22 cooperatively define a customized pathway along which translation guide assembly 24 travels during seat adjustment. As shown, the travel pathway defined by guide slots 20, 22 causes translation guide assembly 24 to rotate slightly as it translates from the first to second ends of the guide slots 20, 22. While the specific relation between first and second guide slots 20, 22 shown includes specific path lengths, diverging ends and convergent mid-sections to provide a predetermined guide path, the guide path may be customized by altering the geometry of the guide slots and distances between linkage pivot points to change the inclination seat back 12 and seat pan 14 throughout the range of motion of the mechanism 10.

Drive rail 18 is supported by seat base 16 and translates linearly relative thereto during seat adjustment. Drive rail 18 is pivotally attached at its forward end to the forward end of seat pan 14 at pivot 40 such that linear translation of drive rail 18 with respect to base 16 causes linear translation of pivot 40 relative to base 16. In a specific embodiment, drive rail 18 includes rack teeth on a bottom surface thereof that engage with and are reciprocally drivable in the horizontal direction by the rotary actuator via pinion gears (not shown). As drive rail 18 moves forward with respect to base 16, seat pan 14 moves forward with respect to base 16 and pivots relative to drive rail 18. Movement and pivoting of seat pan 14 in the opposite direction with respect to drive rail 18 occurs as drive rail 18 moves rearward with respect to base 16.

Translation guide assembly 24 carries first and second guides 42, 44, thereon corresponding to first and second guide slots 20, 22, respectively. First and second guides 42, 44 may include rollers or like structure that travel within and are supported by guide slots 20, 22 to provide smooth, stepless motion of the seat. First and second guides 42, 44 are spaced apart on guide assembly 24, and as shown, guide 42 is positioned generally mid-span and guide 44 is positioned at an end of translation guide assembly 24. Positioned at the opposing end of translation guide assembly 24 is pivot 46 that pivotally connects translation guide assembly 24 to the rearward end of seat pan 14. Pivot 46 connecting translation guide assembly 24 and seat pan 14 is positioned lower on seat pan 14 than pivot 30 connecting seat back 12 and seat pan 14.

Seat pan 14 acts as a link to push or pull translation guide assembly 24 along the paths defined by guide slots 20, 22 as drive rail 18 moves horizontally. As seat pan 14 is pushed pr pulled, the movement of forward pivot 40 and rearward pivot 46 cooperatively move seat pan 14 through an angular range of motion as it is translated through space, thus the seat pan cushion 32 is like wise moved through the same range of motion.

Seat back drive link 26 pivotally connects translation guide assembly 24 to seat back 12 through seat back stop link 48. Seat back stop link 48 is pivotally connected to seat pan 14 at pivot 30 above translation guide connection pivot 46. Seat back stop link 48 is fixed in connection to seat back 12. Seat back drive link 26 is pivotally connected at one end to translation guide assembly 24 intermediate guides 42, 44, and pivotally connected at the opposing end to seat back stop link 48.

Seat back drive link 26, seat back stop link 48, translation guide assembly 24, and the rearwardmost two connection points of seat pan 14 cooperatively form a four-bar linkage system. Seat back drive link 26 synchronizes the angular movement of seat back stop link 48 in conjunction with the angular movement of translation guide assembly 24 relative seat pan 14. As translation guide assembly 24 rotates in space relative to seat pan 14, concurrently seat back stop link 48 rotates via the connection of seat back drive link 26, and likewise seat back 12 and cushion 32 rotate through the same range of motion, as they are directly connected to seat back stop link 48.

As the seat pan 14 inclination approaches the horizontal position translation guide assembly 24 begins to increase rotation as first and second guide slots 20, 22 diverge at a greater rate. Consequently, seat back drive link 26 pulls seat back stop link 48 and seat back 12 downward toward the horizontal position and concurrently forward pivot 46 of translation guide assembly 24 pushes the rearward end of seat pan 14 to the horizontal position. Once drive rail 18 has finished its horizontal travel forward with respect to seat base 16, seat pan 14 and seat back 12 are in a flat configuration.

Thus, as a system the cushioned seat back 12 and seat pan 14 move through the aforementioned positional configurations as drive rail 18 translates horizontally with respect to seat base 16 and the motion is constrained through the four-bar linkage mechanism via the first and second guides 42, 44 and first and second guide slots 20, 22. The system is infinitely adjustable between the upright and flat configurations within the limits of the mechanism 10.

Figure 5:
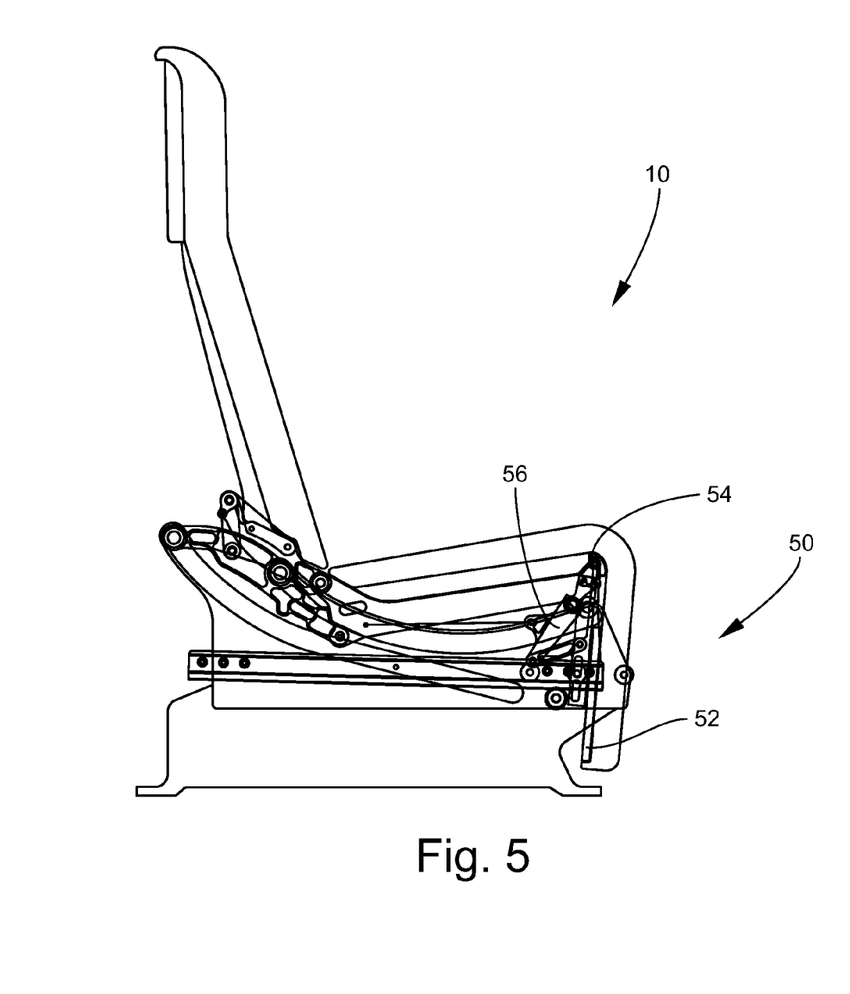
FIG. 5 is a side elevation view of a passenger seat recline mechanism including a leg rest and shown in an upright seating position.
Figure 6:
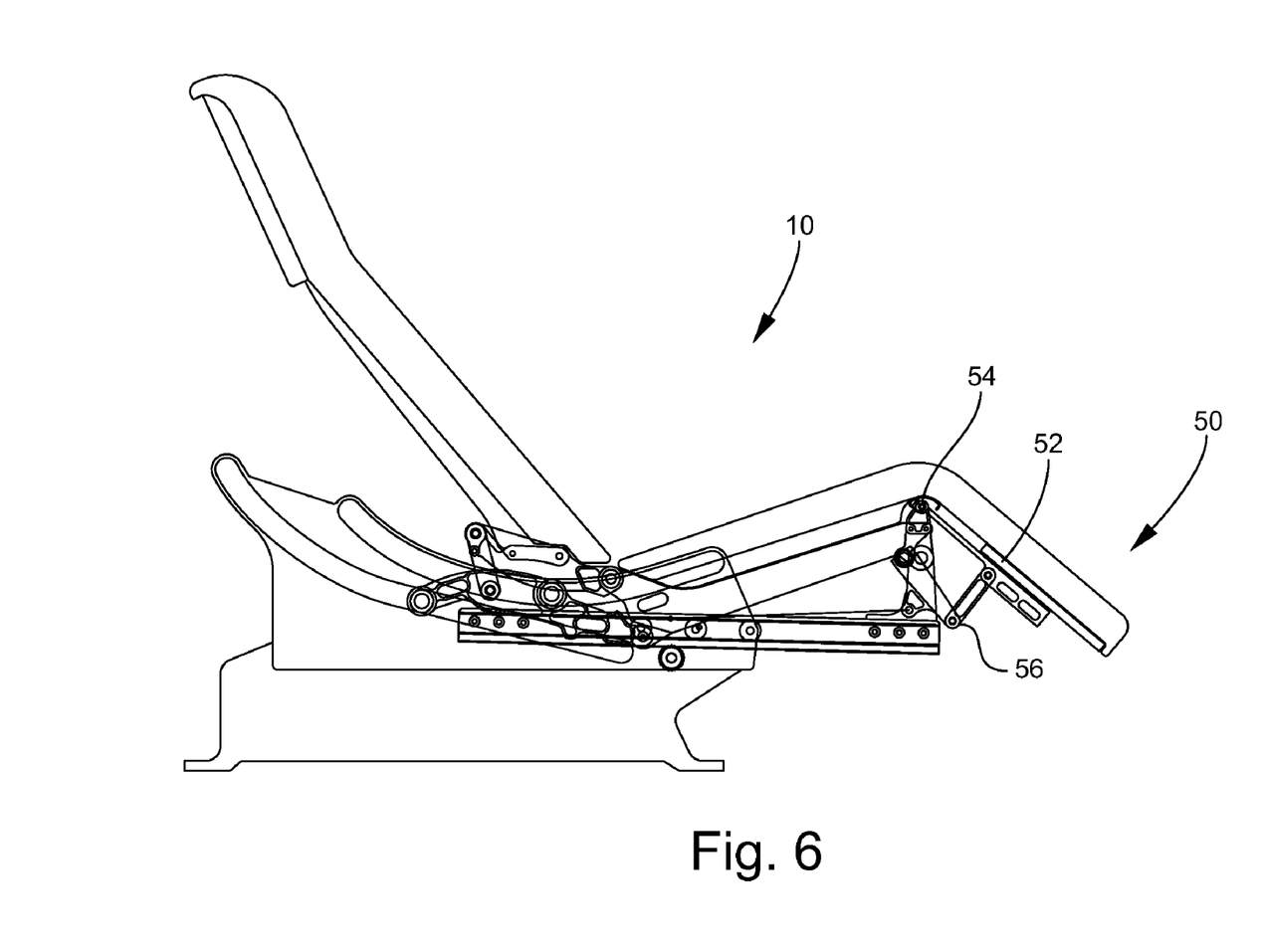
FIG. 6 is a side elevation view of the seat recline mechanism of FIG. 5 shown in a reclined seating position.
Figure 7:
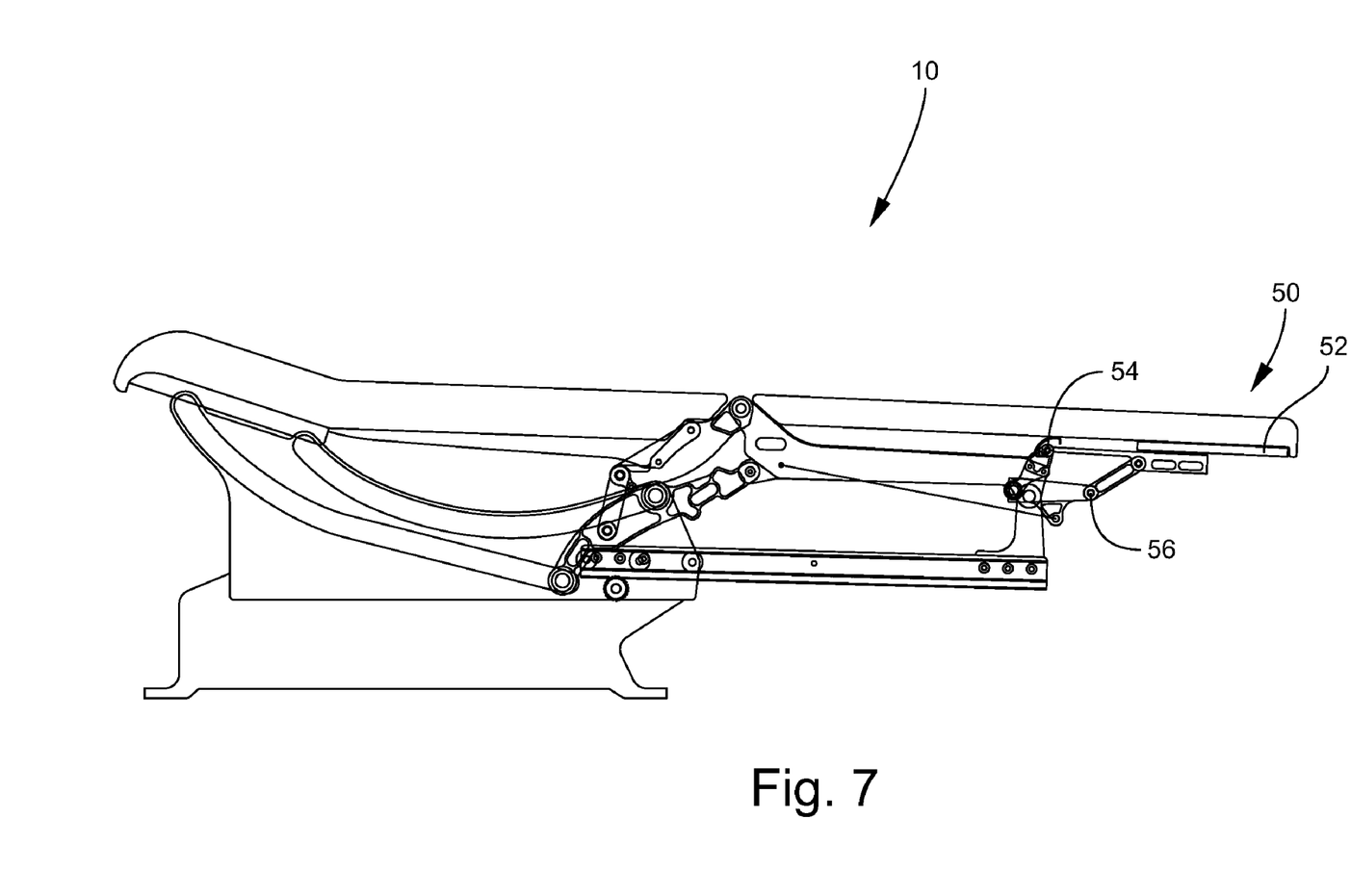
FIG. 7 is a side elevation view of the seat recline mechanism of FIG. 5 shown in a flat seating position.

Referring specifically to FIGS. 5-7, an alternative embodiment of seat recline mechanism 10 includes an adjustable leg rest assembly 50 that moves independently of or concurrently with seat pan 14. Leg rest assembly 50 generally includes cushion carrying leg rest 52 pivotally connected to a forward end of seat pan 14 at pivot 54, and leg rest drive linkage 56 pivotally interconnecting leg rest 52 and seat pan 14 such that translation of drive rail 18 with respect to the seat base 16 causes leg rest 52 to pivot with respect to seat pan 14.

As seat pan 14 inclination approaches the horizontal position leg rest 52 pivots upward to the horizontal position to complete the flat configuration and extend the horizontal surface. Leg rest 52 is driven via leg rest drive linkage 56 that may or may not be ultimately driven by drive rail 18.

Seat recline mechanism 10 described herein may be utilized with secondary fixed leg support structure for achieving the flat configuration or incorporate the adjustable leg rest system attached directly to the forward end of seat pan 14 to serve as a fully supporting sleeping surface while configured in the flat seating position. Seat recline mechanism 10 may further be used in conjunction with moveable armrests that are mechanically linked to the translation system or can be manually operated from an upright support position to a lowered bed position using a fixed slide system mounted on the seat base 16.

While a seat recline mechanism has been described with reference to specific embodiments and examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. A passenger seat recline mechanism, comprising:
   a seat back and a seat pan pivotally connected at a rearward end of the seat pan;
   a seat base having first and second non-intersecting seat path guide slots having diverging rearwards ends, convergent mid-sections, and diverging forward ends, and wherein the forward end of the first seat path guide slot is positioned vertically above its mid-section;
   a seat pan drive rail translatable relative to the seat base and pivotally connected at a forward end thereof to a forward end of the seat pan;
   a translation guide assembly having spaced-apart first and second guides that travel in the first and second guide slots, respectively, such that the translation guide assembly rotates as it travels from the diverging rearward ends to the diverging forward ends of the first and second seat path guide slots such that the seat pan first increases and then decreases its inclination as the seat back reclines relative to the seat pan from an upright position to a horizontal position, the translation guide assembly further being pivotally connected to the rearward end of the seat pan; and
   a seat back drive link pivotally interconnecting the translation guide assembly with the seat back;
   wherein movement of the drive rail with respect to the seat base causes movement of the seat pan and movement of the translation guide assembly with respect to the first and second guide slots to adjust seat back and seat pan angles.

2. The seat recline mechanism according to claim 1, wherein the first and second guide slots are staggered with respect to a vertical axis of the seat and each define an arcuate pathway such that movement of the translation guide assembly from rearward ends of the guide slots to forward ends of the guide slots causes rotational and translational motion of the translation guide assembly with respect to the seat base.

3. The seat recline mechanism according to claim 1, wherein the seat pan drive rail is linear and the movement thereof causes linear movement of a pivot of the drive rail and the seat pan with respect to the seat base.

4. The seat recline mechanism according to claim 1, wherein the seat back drive link is pivotally connected to the translation guide assembly intermediate the first and second guides.

5. The seat recline mechanism according to claim 1, further comprising an adjustable leg rest assembly attached to the forward end of the seat pan, comprising:
   a leg rest pivotally connected to a forward end of the seat pan; and
   leg rest drive linkage driving pivoting movement of the leg rest with respect to the seat pan.

6. The seat recline mechanism according to claim 5, further comprising a cushion carried on at least one of the seat back, the seat pan and the leg rest.

7. The seat recline mechanism according to claim 1, further comprising a back stop link connected to the seat back and pivotally connected to the aft end of the seat pan above a translation guide assembly connection point with the seat pan.

8. A passenger seat having a seat recline mechanism for adjusting the seat between upright and flat seating positions, comprising:
- a seat back and a seat pan pivotally connected for cooperative movement;
- a seat base carrying first and second guide slots having diverging rearwards ends, convergent mid-sections, and diverging forward ends, and wherein the forward end of the first guide slot is positioned vertically above its mid-section;
- a seat pan drive rail associated with the seat base and translatable relative thereto, the drive rail pivotally connected at a forward end to a forward end of the seat pan;
- a translation guide assembly pivotally connected to a rearward end of the seat pan at a connection point below a connection point of the seat pan and the seat back, the translation guide assembly having spaced-apart first and second guides thereon that travel in the first and second guide slots, respectively, such that the translation guide assembly rotates as it travels from the diverging rearward ends to the diverging forward ends of the first and second guide slots such that the seat pan first increases and then decreases its inclination as the seat back reclines relative to the seat pan from an upright position to a horizontal position; and
- seat back drive linkage pivotally interconnecting the translation guide assembly and the seat back;
- wherein movement of the drive rail with respect to the seat base causes movement of the seat pan and movement of the translation guide assembly with respect to the first and second guide slots to adjust seat back and seat pan angles.

9. The passenger seat according to claim 8, wherein the first and second guide slots each define an arcuate pathway such that movement of the translation guide assembly from rearward ends of the guide slots to forward ends of the guide slots causes rotational and translational motion of the translation guide assembly with respect to the seat base.

10. The passenger seat according to claim 8, wherein the seat pan drive rail is linear and the movement thereof causes linear movement of a pivot of the drive rail and the seat pan with respect to the seat base.

11. The passenger seat according to claim 8, wherein the seat back drive linkage comprises a link pivotally connected to the translation guide assembly and pivotally connected to a back stop link connected to the seat back.

12. The passenger seat according to claim 8, further comprising an adjustable leg rest assembly attached to the forward end of the seat pan, comprising:
- a leg rest pivotally connected to a forward end of the seat pan; and
- leg rest drive linkage driving pivoting movement of the leg rest with respect to the seat pan.

13. The passenger seat according to claim 12, further comprising a cushion carried on at least one of the seat back, the seat pan and the leg rest.

* * * * *